United States Patent [19]

McDermott

[11] 3,718,005
[45] Feb. 27, 1973

[54] REACTIVATED LOW TEMPERATURE ADSORBER SYSTEM WITH A NON-ADSORBING COLD ACCUMULATOR

[75] Inventor: Richard L. McDermott, Somerset, N.J.

[73] Assignee: Airco, Inc., New York, N.Y.

[22] Filed: March 25, 1970

[21] Appl. No.: 22,483

[52] U.S. Cl. .............................. 62/13, 62/18, 62/38
[51] Int. Cl. ............................... F25j 3/04, F25j 5/00
[58] Field of Search............62/12, 13, 14, 15, 18, 29, 62/28; 55/62, 68

[56] References Cited

UNITED STATES PATENTS 2,981,082   4/1961   Sixsmith....................................62/13
3,355,859   12/1967  Karwat......................................62/18
3,554,904   1/1971   Humphries................................62/18

Primary Examiner—Norman Yudkoff
Attorney—Edmund W. Bopp and H. Hume Mathews

[57] ABSTRACT

A gas processing system having cyclicly reactivated adsorbers normally operable in a low temperature range, a cold accumulator for refrigeration storage, and valved conduits interconnecting the adsorbers, accumulator and a source of reactivation gas, providing for isolation of an adsorber for reactivation; transfer of the adsorber refrigeration to the accumulator by a reactivation gas stream; reactivation and purging of the adsorber by heated reactivation gas; cooling of the adsorber by reactivation gas at ambient temperature; retransfer of the refrigeration from the accumulator to the adsorber by a counterstream of reactivation gas; and supplemental final cool-down of the adsorber by cold system gas.

13 Claims, 2 Drawing Figures

REACTIVATED LOW TEMPERATURE ADSORBER SYSTEM WITH A NON-ADSORBING COLD ACCUMULATOR

BACKGROUND OF THE INVENTION

In gas processing systems such as those for air separation, different methods for cooling and purifying the gas stream prior to rectification have been used, depending primarily on the product requirements of the processing plant and its economy of operation. According to one well known "reversing" method, reversing regenerators of the Frankl type are used in conventional cyclic manner, i.e., first, a regenerator is chilled by cold effluent gases, and then it functions to chill in turn, the incoming gas stream, thereby causing undesired constituents such as carbon dioxide, water, etc. to be separated and retained as frozen deposits in the regenerator. Accordingly, the regenerator must be frequently purged for thawing and removing these constituents from the regenerator for maintaining therethrough sufficient air flow. As a result, the cyclic purge flow requirements limit the product recovery in the reversing method to about 40 percent of the air flow; and of this recovery, about one-half is oxygen. It follows therefore, that when the desired nitrogen production rate exceeds the oxygen flow rate, a higher (and economical) product recovery rate is required.

The reversing method therefore is seen to have inherent practical disadvantages and cannot be used economically where high nitrogen production is required of the processing plant.

According to another method in common use, herein termed "non-reversing," wherein the process is continuous and product recovery is materially higher, the process air is cooled and dried, after which carbon dioxide is removed from the air stream by parallel-connected absorbers having silica gel and/or molecular sieves. In these plants the on-stream operation of adsorbers at low temperatures such as $-140°$ F, is common practice as it makes possible higher adsorbent capacity as compared with ambient temperature adsorption. However, in conventional practice there is during reactivation a significant loss of system refrigeration since, following depressurization, the temperature of the cold adsorber mass must be elevated by a heated reactivating gas to about 300° F, and then when reactivation is complete, refrigeration must be re-supplied for final cool-down of the adsorber.

Accordingly, as each adsorber is cyclically taken out of service for cleaning and reactivation, additional power in one form or another must be supplied to the system for making up the adsorber refrigeration lost. Thus, where the non-reversing method is used for higher product recovery, it has heretofore involved higher costs due to the large adsorber refrigeration losses and the equipment required for compensating such losses.

The present invention is concerned with conservation of system power where low temperature adsorbers are used for avoiding a great part of the adsorber reactivation power loss.

SUMMARY OF THE INVENTION

The invention, although primarily concerned with conservation of power for multi-bed adsorber systems operating at below-ambient temperatures, is especially useful in non-reversing systems as described above, wherein adsorber reactivation power costs can be a determining factor in the over-all economy of the gas processing plant.

In practicing the invention, reactivation of adsorbers normally operating at low temperature in a gas processing system is accomplished economically and with material conservation of power by transferring the adsorber refrigeration to a cold accumulator for storage during cyclic reactivation and warming of the off-stream adsorber, and subsequently retrieving the stored refrigeration for cooling down the adsorber in preparation for its normal low temperature operation.

To this end, in a preferred form of the invention as used in a non-reversing gas processing system, the adsorbers, cold accumulator, and a source of reactivating gas are interconnected by valve-controlled conduits for selectively reactivating each adsorber in a cyclic program. Initially, the cold adsorber is depressurized through the accumulator, following which the reactivating gas, initially at ambient temperature, is serially directed, first through the adsorber and then through the accumulator for transferring to and storing therein the adsorber refrigeration. When the adsorber outlet temperature rises to a predetermined point, such as 0° F, the reactivating gas is valved directly through the adsorber to atmosphere for partial purging and warming to about ambient temperature. For major purging, the reactivating gas is then heated for raising the temperature of the adsorber to about 300° F for completing the reactivation.

Following adsorber cool-down to ambient temperature, the stored refrigeration in the accumulator is retrieved for further cool-down by passing unheated reactivation gas now in reverse serial flow, first through the accumulator and then through the adsorber for retransfer of refrigeration thereto. Final cool-down to the normal low temperature condition is accomplished by adding some of the cold process gas to the reactivating line, thereby restoring the adsorber to its active-cycle condition.

A principal object of the invention, therefore, is an improved system for economically reactivating low temperature or cryogenic adsorbers such as those used for example, in processing gaseous mixtures.

A related object is an improved reactivation system for low temperature adsorbers as described above, wherein power conservation is achieved by transferring the refrigeration of the adsorber to be reactivated to a cold storage unit, and retransferring the refrigeration to the adsorber when the adsorber reactivation cycle is completed, for cooling the adsorber for normal operation.

Other objects, features and advantages will appear from the following description with reference to the accompanying drawings.

DESCRIPTION OF PREFERRED EMBODIMENT

Figure 1:
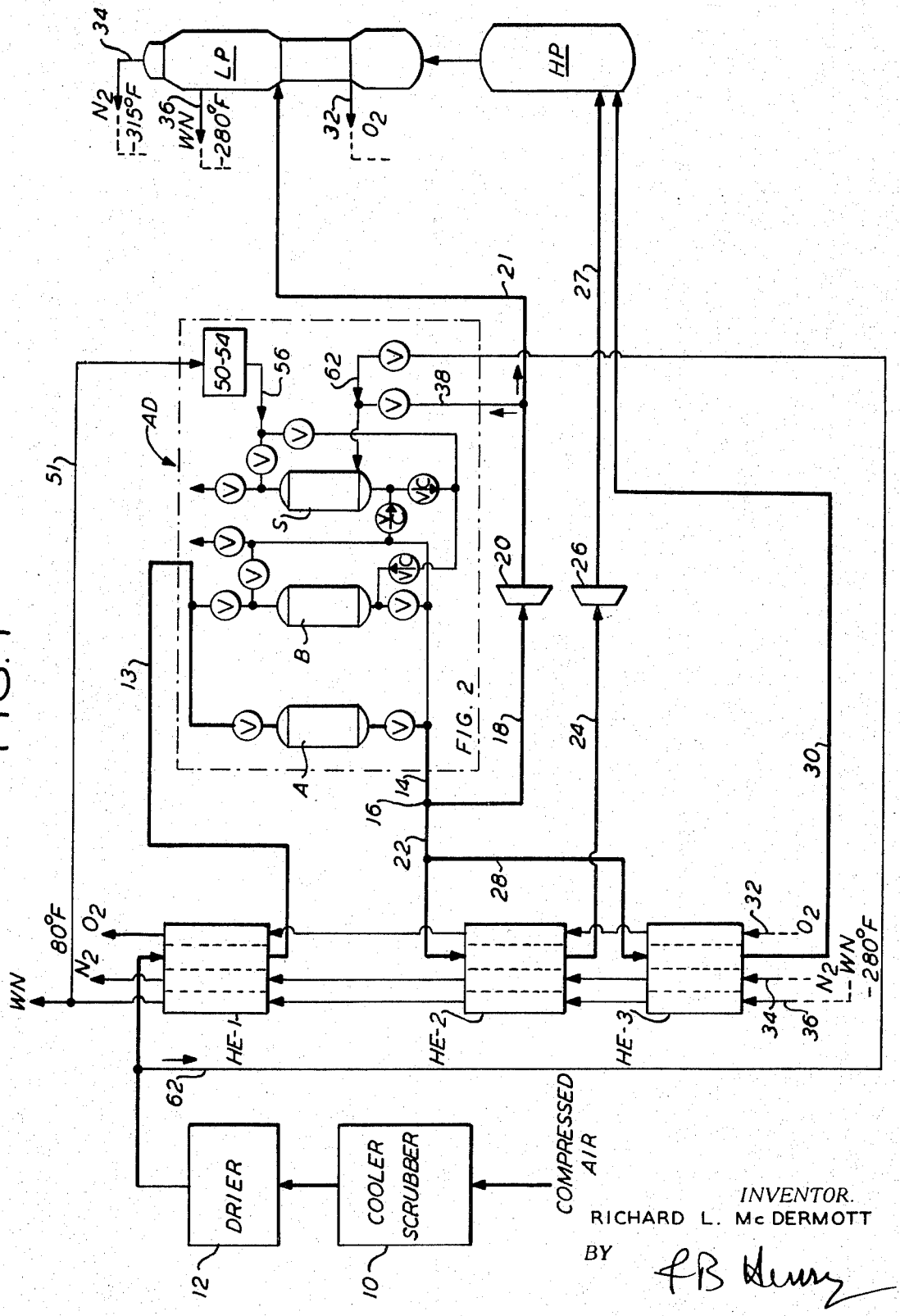
FIG. 1 is a simplified flow diagram of an air separation plant embodying the adsorber system of the invention.

The adsorber system of the invention has general application to gas processing plants wherein low temperature adsorbers are used for removing one or more constituents of a gas stream being processed, and is shown by way of example in FIG. 1 as part of an air separation plant. The plant yields as cryogenic separation products, commercially useful nitrogen and oxygen.

Referring first to FIG. 1, compressed air to be processed and separated into its primary constituents is directed through a water-cooled unit or tower 10 and into a drier 12 where moisture and easily condensed constituents are removed. From the drier the compressed air stream is passed through a heat exchanger HE-1 in counter-flow relation to cold product gases as indicated. The cooled gas stream now at about $-140°$ F, is then directed by line 13 through at least one of a bank of parallel-connected adsorber units, such adsorbers A and B that are included in the assumed adsorber system, generally indicated at AD in outline. In practice, several adsorber units form a bank with the active units operating in parallel while an isolated unit is being reactivated; thus, for a 24 hour period, each unit in a bank of four can be reactivated in turn by a stepping program for advancing in 8 hour steps each unit, one behind the other.

In the present instance it will be assumed that the process air stream is through adsorber unit A, with unit B off-stream and temporarily out of service for cyclic reactivation, etc. The adsorber A which may be of convention type using silica gel 13X as the adsorber material, functions in known manner for removing carbon dioxide, and other easily condensed or filterable constituents from the air stream. This type of sieve also has comparatively low resistance to air flow therethrough. During this process the interior of the adsorber is chilled by the refrigerated air stream that comes from the heat exchanger HE-1 at about $-140°$ F, so that the adsorber temperature tends to stabilize at this value. Accordingly, the adsorber functions at this more efficient low temperature level for air cleaning and filtering purposes as described above.

From the adsorber A the cooled and purified air stream in outlet line 14, divides at junction 16 into two parts, one of which in line 18 is expanded by turbine 20 into line 21 and the low pressure section LP of the rectifier column, and the other part in line 22 primarily passing through heat exchanger HE-2 to outlet line 24, where it is expanded by turbine 26 into line 27 and the high pressure section HP of the rectifier column.

A portion of the stream in line 22 is diverted into line 28 and passed through heat exchanger HE-3 where it is substantially liquefied and fed by line 30 to the lower part of the high pressure section for evaporation and heat exchange in the usual rectification process. Further description of the rectification column is unnecessary for an understanding of the present invention, it being sufficient to note that the separation product gases, i.e., the rectified nitrogen and oxygen are piped at 34 and 32 from the lower and upper portions respectively, of the low pressure section LP, and waste nitrogen is piped at 36 also from section LP, all for passage through the heat exchangers HE-3, HE-2 and HE-1 as indicated by the flow lines. Thus, the heat in the process air stream is transferred to the cold oxygen and nitrogen streams so that the process stream is chilled and the cold gas streams in turn, are gradually warmed to about the ambient temperature as they leave the outlet of heat exchanger HE-1 for storage, etc.

Figure 2:
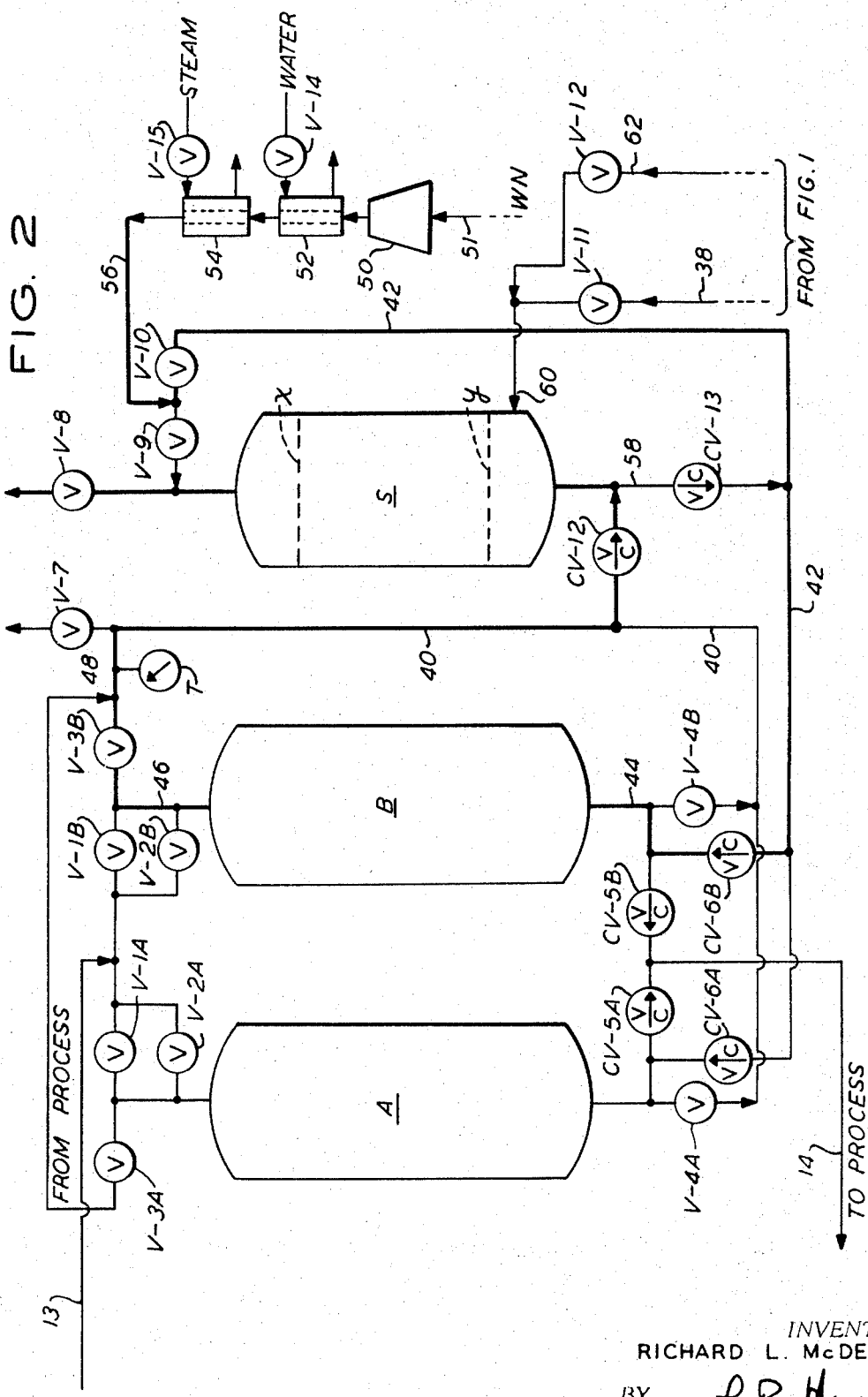
FIG. 2 illustrates in greater detail the accumulator and adsorber units, with one adsorber unit connected for reactivation.

Referring now to FIG. 2, the adsorber system is shown for simplicity as consisting of but two adsorber units A and B and a storage or accumulator unit S, all interconnected for alternately keeping one adsorber on-stream in normal service while the other is being reactivated and processed through the accumulator S in accordance with the invention.

The cooled air in process line 13 from exchanger HE-1 is selectively fed to either adsorber A or B through sectionalizing valves V-1A or V-1B as the case may be, and from the respective adsorber through one-way check valves CV-5A or CV-5B, to the system outlet line 14 for further processing as described above. Assuming that adsorber A is on-stream and that adsorber B is isolated therefrom for reactivation, etc., the valve V-1A is opened and bypass valve V-3A is closed so that the process air stream flows through adsorber A for removal of $CO_2$, etc., and through check valve CV-5A to the outlet line 14. The adsorber at approximately $-140°$ F remains at line pressure, usually about 100 psig, while on-stream.

For isolating and processing the adsorber B, valves V-1B and V-2B are closed and V-4B is opened to depressurize the adsorber through the accumulator S to atmosphere by way of the line 40, check valve CV-12 and exhaust valve V-8. The check valve CV-5B is maintained closed for isolating unit B by the higher pressure in the process line 14. During depressurization, an exhaust valve V-7 for venting the line 40 leading from the valve V-4B is closed. It will be noted that during depressurization, an initial amount of refrigeration from adsorber A is stored in the accumulator as the cold adsorber exhaust is directed therethrough. Following depressurization, V-4B is closed and V-3B is opened, the isolating valves V-1B and V-2B remaining closed.

For the refrigeration transfer, the transfer valve V-10 is opened and reactivation gas at ambient temperature is admitted under blower pressure through line 56, line 42, check valve CV-6B and line 44 into the adsorber B, from which it flows through line 46, valve V-3B lines 48 and 40, and check valve CV-12, upward through the accumulator S to exhaust to atmosphere at valve V-8. The stream of reactivating gas therefore functions as a carrier for transferring the refrigeration from adsorber B to the accumulator, the process being completed when the temperature indicator T in line 48 indicates that the adsorber outlet temperature has increased to approximately $0°$ F. At this point, the refrigeration of adsorber B is considered for practical purposes as being transferred to the accumlator. The exhaust valve V-8 is now closed and the valve V-7 is opened for venting the reactivation gas directly through the adsorber to atmosphere.

The reactivating gas can be any suitable inert gas such as nitrogen, that is readily available and economical. For example, in the air separation process of FIG. 1, the waste nitrogen WN from the rectifier line 36 after passage through the heat exchangers to vent line 51, is found to be satisfactory for this purpose, since it can be taken directly from the exhaust of exchanger HE-1 at about ambient temperature has sufficiently high specific heat for transfer purposes and is comparatively inert for efficient reactivation.

Summarizing briefly, the refrigeration of adsorber B is transferred for temporary storage to the accumulator S by a carrier stream of reactivating (or transfer) gas that traverses in series relating the adsorber and accumulator, respectively. The start-temperature of the compressed transfer gas can be lowered somewhat if desired, by passing the stream through a water cooler indicated at 52. A blower 50 maintains the transfer gas under sufficient pressure for producing a flow rate that is optimum for efficient heat transfer at the respective units, and that is compatible with the cycle time allowed for reactivation.

The cold accumulator S can be of any suitable type having low resistance to gas flow and large heat storage capacity. In the present instance it comprises a tank that is packed with ¼ inch size rocks, and is insulated for cryogenic temperatures. Its function therefore is solely that of heat storage and transfer; i.e. it has neither adsorbing nor absorbing capability.

When refrigeration transfer is completed according to the adsorber temperature reading at T, a heater unit 54 in heat transfer relation to the reactivation line 56 is turned on for providing hot reactivating gas for the adsorber. As shown, the heat can be supplied through valve V-15 from a source of live steam. For setting up the reactivation cycle the accumulator exhaust valve V-8 is closed, the adsorber exhaust valve V-7 is opened for by-passing the accumulator, and the water cooler 52 is turned off. The valves V-10 and V-3B remain open.

The blower 50 now forces a stream of hot reactivation gas by way of valve V-10 and lines 42 and 44 upward through the adsorber B into outlet lines 46 and 48 for exhaust to atmosphere at valve V-7. When the outlet temperature of the adsorber has increased to about 300° F at indicator T, it is held at this point for a preferred time, after which reactivation can be considered complete, subject to cooling down of the adsorber for another on-stream cycle of operation.

In prior practice, cooling of the adsorbers was accomplished in various ways, such as by cooling with a part of the waste nitrogen, otherwise useful for heat transfer purposes. Thus, the work represented by the original adsorber refrigeration was lost to the system, and additional input work was required for restoring the adsorber to its normal low temperature condition. According to the present invention, however, the original adsorber refrigeration stored in the accumulator is retrieved for restoring the adsorber temperature to approximately its normal low level, thereby conserving power represented by the cool-down operation. Since the adsorber units in modern, large capacity air separation plants are necessarily massive, each containing in some instances several tons of adsorbent material, it will be apparent that the cyclic loss of adsorber refrigeration over evan a short operating period has heretofore represent a considerable amount of power that must be re-supplied to the system.

Referring again to FIG. 2, cool-down is initiated by again turning on the water cooler 52 (the heater 54 having been turned off) and directing the unheated reactivating gas through the adsorber for exhaust to atmosphere at V-7. The adsorber bed is thereby cooled to about 110° F in readiness for refrigeration retransfer.

For principal cool-down, the valve V-9 is opened and the valve V-10 is closed, the valves V-8 and V-B remaining closed and the vales V3-B and V-7 remaining open. In the transfer gas line 57 the water cooler 52 remains on. The water-cooled transfer gas is now blown through valve V-9 into the accumulator and downward therethrough to the adsorber B by way of outlet line 58, check valve CV-13, line 42, check valve CV-6B and line 44. As the now refrigerated transfer gas flows upwardly through the adsorber mass, refrigeration is gradually restored to the mass by heat transfer until the reading at T indicates that the minimum temperature has been reached, i.e., that heat transfer within the accumulator has approached a critical minimum. Since there will be, during transfer and retransfer, certain heat leakage, the comparatively small amount of supplemental or makeup refrigeration required for bringing the adsorber temperature down to about −140° F can economically be supplied by line 38 from the process air line 21, FIG. 1, downstream of the expansion turbine 20, as the stream temperature at this section is in the neighborhood of −200° F. Preferably the supplemental cooling air is valved at V-11 into the transfer line near the lower end of the accumulator at 60. This cold process air, which is continuously bled into the lower or refrigeration receiving end of the accumulator enhances steady-state operation of the system and minimizes interruptions due to thermal unbalance, as could be the case for example, were cold liquid nitrogen periodically fed from a storage tank for make-up refrigeration. This will be apparent by referred to FIG. 2 which indicates the approximate locations of the accumulator refrigeration boundary lines for normal steady-state operation. At the end of refrigeration transfer to the accumulator the refrigeration zone extends, say up to line $x$, whereas at the end of retransfer it has dropped to line $y$ near the bottom of the accumulator. Thus, uneven addition of make-up refrigeration differing widely in temperature from the zone temperature could change the zone location and upset the thermal balance of the accumulator.

For stabilizing the temperature and preventing freezing of carbon dioxide at the lower end of the accumulator by cold process air from line 38, a small amount of dry air at about 40° F is diverted from the drier outlet, FIG. 1, into line 62 where it passes through a throttling valve V-16 into the accumulator inlet 60, FIG. 2. The temperature of the inlet air is thereby moderated to the extent necessary for preventing freezing of carbon dioxide while providing required make-up refrigeration for adsorber cool-down.

With the reactivated and refrigerated adsorber B now ready for on-stream service, it is put on the line and adsorber A taken out for a similar reactivation and refrigeration transfer cycle by operation of appropriate sectionalizing and control valves diagrammatically indicated in FIG. 2. The inlet line 46 of the absorber B is connected to the incoming process line 13 by closing valve V-3B and initially opening bleed valve V-2B for gradual pressurization, following which main valve V-1B is opened. The adsorber outlet line 44 is connected to the outgoing process line 14 through check CV-5B. The adsorber A is in turn, isolated from the process line by closing inlet valve V-1A, bleed valve V-2A and outlet valve V-4A. It will now be apparent that the inlet side of adsorber A can be connected through its valve V-3A and shunt line 62 to the lines 48 and 40 in the manner previously described for adsorber B, and that the outlet side can be connected in similar manner to the lines 40 and 42 by valves V-4A and CV-6A respectively, for completing the reactivation and refrigeration transfer cycle for the adsorber A.

Conventional cyclic timing and control for periodic reactivation of the adsorbers in regular sequence can be used in practicing the invention. For example, the temperature indicator T can be related in well-known manner to the timing system for operating signal lamps, alarms, etc. where the adsorber outlet temperature is incorrect for a given reactivation sequence; also, where desired, the valve control circuitry can include interlocks for preventing valve operation in case of malfunction, improper sequence, etc.

For simplicity in description, the terms "cold" and "refrigeration"d are used in a substantive or positive sense throughout the application, although it is understood from the physical viewpoint that "cold" merely signifies the absence of heat.

Having set forth the invention in what is considered to be the best embodiment thereof, it will be understood that changes may be made in the system and apparatus as above set forth without departing from the spirit of the invention or exceeding the scope thereof as defined in the following claims.

I claim:

1. In a gas processing system having a plurality of low temperature adsorber units connected in parallel for removing constituents such as carbon dioxide, from a cold stream of process gas, means providing for selective isolation, reactivation and cool-down of each adsorber unit in turn while the other unit or units are in operation, a separate cold accumulator unit having a non-adsorbing and a non-absorbing bed of heat storage material, the method of conserving adsorber refrigeration during the reactivation cycle which comprises:
   a. directing a stream of gas at about ambient temperature, serially through an isolated adsorber unit and through the accumulator unit for transferring the adsorber refrigeration to the accumulator unit for storage therein,
   b. heating the adsorber unit by directing therethrough in bypass relation to the accumulator a stream of heated reactivating gas for purging the adsorber of the separated constituents,
   c. directing an unheated stream of reactivating gas separately through the adsorber for initial cooling thereof, and
   d. directing an unheated stream of reactivating gas serially through the accumulator unit and through the adsorber for retransferring the stored refrigeration to the adsorber for cooling thereof.

2. The method as specified in claim 1 wherein the process gas is pressurized and the adsorber upon isolation from the process stream is depressurized through the accumulator unit for initial transfer of refrigeration.

3. The method as specified in claim 1 wherein the refrigeration transfer and retransfer streams, and the adsorber reactivations stream are directed under pressure from a common source of process waste gas taken from the processing system at about ambient temperature.

4. The method as specified in claim 1 wherein the adsorber unit is cooled down to its normal low operating temperature by adding to the retransfer stream a portion of cold process gas downstream of the adsorbers.

5. The method as specified in claim 4 wherein the cold process gas is bled continuously into the accumulator unit at its refrigeration-receiving end.

6. The method as specified in claim 5 wherein a portion of dry, comparatively warm process gas upstream of the adsorbers is mixed with the cold process gas for moderating its temperature to above the freezing point of carbon dioxide.

7. The method as specified in claim 1 wherein the process gas is air to be separated into its principal components, and the reactivating gas is warm waste nitrogen from the processing system.

8. In a gas processing plant, a low temperature adsorber system comprising a plurality of parallel-connected adsorbers for removing carbon dioxide from a cold stream of process gas, selectively operated valving means for isolating in turn, each on-stream adsorber for cyclic reactivation, a source of reactivating gas at ambient temperature, means for selectively heating the reactivation gas, a cold accumulator unit having a non-adsorbing and non-absorbing bed of heat storage material, conduits interconnecting the cold isolated adsorber, cold accumulator unit and source of reactivating gas, and a plurality of conduit valves for selectively controlling respective interconnections, certain of said valves controlling flow of unheated reactivating gas serially through the isolated adsorber and the accumulator certain of said valves controlling flow of heated reactivating gas solely through the adsorber for heating it to reactivation temperature; and certain of said valves controlling reverse flow of unheated reactivating gas serially through the accumulator unit and isolated adsorber for cooling the adsorber.

9. A low temperature adsorber system as specified in claim 8 wherein the source of reactivation gas is waste product gas at about ambient temperature from the processing plant.

10. A low temperature adsorber system as specified in claim 8 wherein the accumulator unit near one refrigeration re-transfer end thereof is connected through a conduit and control valve to a source of cold process gas downstream of the adsorbers.

11. A low temperature adsorber system as specified in claim 10 wherein a valve controlled conduit is connected between a source of comparatively warm, dry process gas upstream of the adsorbers, and the aforesaid one end of the accumulator unit.

12. A low temperature adsorber system as specified in claim 8 wherein the accumulator unit comprises a tank insulated for cryogenic temperatures and packed with rocks of about ¼ inch size for high heat storage capacity.

13. A low temperature adsorber system as specified in claim 9 wherein the reactivating gas supply conduit includes selectively operated heating and cooling units respectively.

* * * * *